US011240487B2

(12) United States Patent
Wu et al.

(10) Patent No.: US 11,240,487 B2
(45) Date of Patent: Feb. 1, 2022

(54) METHOD OF STEREO IMAGE DISPLAY AND RELATED DEVICE

(71) Applicant: Sung-Yang Wu, Hsinchu (TW)

(72) Inventors: Sung-Yang Wu, Hsinchu (TW); Sung-Ching Lin, Hsinchu County (TW)

(73) Assignee: Sung-Yang Wu, Hsinchu (TW)

( * ) Notice: Subject to any disclaimer, the term of this patent is extended or adjusted under 35 U.S.C. 154(b) by 0 days.

(21) Appl. No.: 17/184,617

(22) Filed: Feb. 25, 2021

(65) Prior Publication Data

US 2021/0185301 A1 Jun. 17, 2021

Related U.S. Application Data

(63) Continuation-in-part of application No. 15/368,693, filed on Dec. 5, 2016, now abandoned.

(51) Int. Cl.

| | |
|---|---|
| ***G06F 3/01*** | (2006.01) |
| ***H04N 13/302*** | (2018.01) |
| ***H04N 13/363*** | (2018.01) |
| ***H04N 13/383*** | (2018.01) |

(52) U.S. Cl.

CPC ........... *H04N 13/302* (2018.05); *G06F 3/013* (2013.01); *H04N 13/363* (2018.05); *H04N 13/383* (2018.05)

(58) Field of Classification Search

CPC .............................. G06F 3/013; H04N 5/2628

See application file for complete search history.

(56) References Cited

U.S. PATENT DOCUMENTS

| | | | |
|---|---|---|---|
| 8,704,879 | B1 | 4/2014 | Cheng |
| 2008/0136916 | A1 | 6/2008 | Wolff |
| 2013/0135295 | A1 | 5/2013 | Li |
| 2015/0062536 | A1 | 3/2015 | Auger |
| 2016/0078680 | A1 | 3/2016 | Reif |

FOREIGN PATENT DOCUMENTS

| | | | |
|---|---|---|---|
| CN | 102314856 | A | 1/2012 |
| CN | 103531094 | | 1/2014 |
| CN | 104539924 | A | 4/2015 |
| TW | I369636 | | 8/2012 |
| TW | I540880 | | 7/2016 |

*Primary Examiner* — Y Lee

(74) *Attorney, Agent, or Firm* — Winston Hsu

(57) ABSTRACT

A method of stereo image display for a portable device is disclosed. The method comprises obtaining an image, tracking user's eye positions relative to a display area of the portable device, to obtain viewports of the image and view frustums for user's left and right eyes, rendering two projection images respectively for user's left and right eyes according to the view frustums and viewports of the image, and displaying the two projection images for the user.

1 Claim, 6 Drawing Sheets

20

| Step | |
|---|---|
| Obtain an image | 201 |
| Track user's eye positions relative to a display area of the portable device, to obtain viewports of the image and view frustums for user's left and right eyes | 202 |
| Render two projection images respectively for user's left and right eyes according to the view frustums and the viewports of the image | 203 |
| Display the two projection images for the user, to form a stereo image | 204 |

The translate matrix is
{1,0,0,dx,0,1,1,dy,0,0,1,dz,0,0,0,1}

A rotation matrix
{1,0,0,0,1,0,0,0,0,-1,0,0,0,1}

METHOD OF STEREO IMAGE DISPLAY AND RELATED DEVICE

CROSS REFERENCE TO RELATED APPLICATIONS

This is a continuation-in-part application of Ser. No. 15/368,693, filed on 2016 Dec. 5, the contents of which are incorporated by reference.

BACKGROUND OF THE INVENTION

1. Field of the Invention

The present invention relates to a method of stereo image display and a related device, and more particularly, to a method of rendering stereo-hologram and stereo-mirror image and a related device.

2. Description of the Prior Art

In recent years, portable devices, such as smart phones, tablets, handheld game consoles, and car navigation systems, become popular because of the lightweight and compact displays and other additional features, such as stereo image or 3D image displaying. That is, the portable device equipped with a display panel and a camera is used to display stereo image. However, there is no specification for rendering and displaying stereo image with motion parallax. For example, the user may move his/her head or rotate the portable device, which may cause unsmooth motion parallax for stereo image display.

In addition, the smart phone's users suffer from image distortion for long time. The front-facing camera on upper part of phone causes the user's chin looks bigger than usual, and thus the output image is not sufficient for daily use (e.g. make up with a smart phone displaying a distortion image).

SUMMARY OF THE INVENTION

It is therefore an objective to provide a method of stereo image display and related device to solve the above problem.

The present invention discloses a method of stereo image display for a portable device. The method comprises obtaining an image, tracking user's eye positions relative to a display area of the portable device, to obtain viewports of the image and view frustums for user's left and right eyes, rendering two projection images respectively for user's left and right eyes according to the view frustums and viewports of the image, and displaying the two projection images for the user.

The present invention discloses a portable device for displaying stereo image. The portable device comprises a display module, for displaying an image, an eye-tracking module, for tracking a user's eye positions relative to the display module, to obtain view frustums for user's eyes and viewports of the image, and an image rendering module, coupled to the display module and the eye-tracking module, for rendering two projection images respectively for user's left and right eyes according to the view frustums and the viewport of the image, whereby the display module display the two projection images for the user.

The present invention further discloses a portable device for displaying stereo image. The portable device comprises a processing unit, for executing a program code, and a storage unit, coupled to the processing unit, for storing the program code, wherein the program code instructs the processing unit to perform the following steps: obtaining an image, tracking user's eye positions relative to a display area of the portable device, to obtain viewports of the image and view frustums for user's left and right eyes, rendering two projection images respectively for user's left and right eyes according to the view frustums and viewports of the image, and displaying the two projection images for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
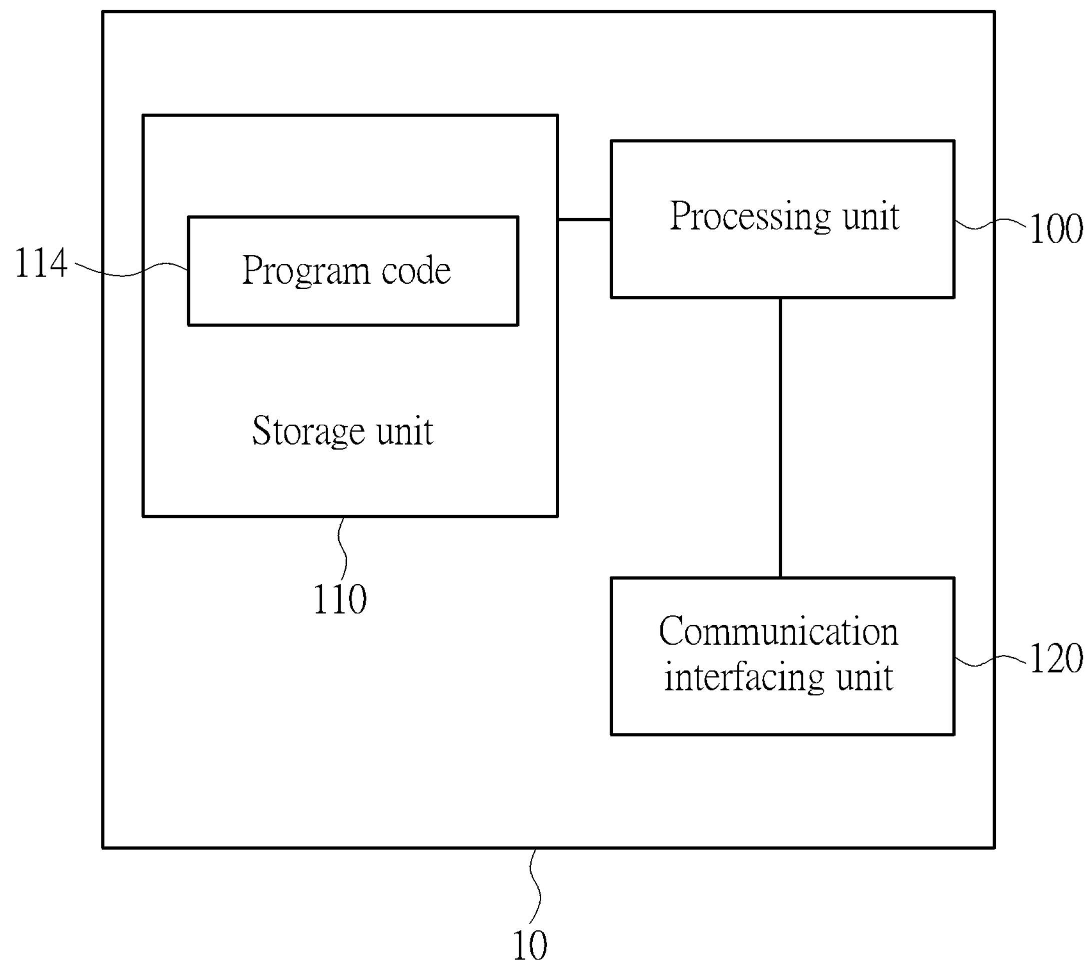
FIG. 1 is a schematic diagram of a portable device according to an embodiment.

FIG. 1 is a schematic diagram of the portable device 10 according to one embodiment of the present disclosure. The portable device 10 may be a smart phone, a tablet, and a handheld device, but not limited herein. The portable device 10 includes a processing unit 100, such as a microprocessor or Application Specific Integrated Circuit (ASIC), a storage unit 110 and a communication interfacing unit 120. The storage unit 110 may be any data storage device that can store a program code 114, for access by the processing unit 100. Examples of the storage unit 110 include but are not limited to a subscriber identity module (SIM), read-only memory (ROM), flash memory, random-access memory (RAM), CD-ROMs, magnetic tape, hard disk, and optical data storage device. The communication interfacing unit 120 could be a wireless transceiver for exchange signals with other devices/modules.

Figure 2:
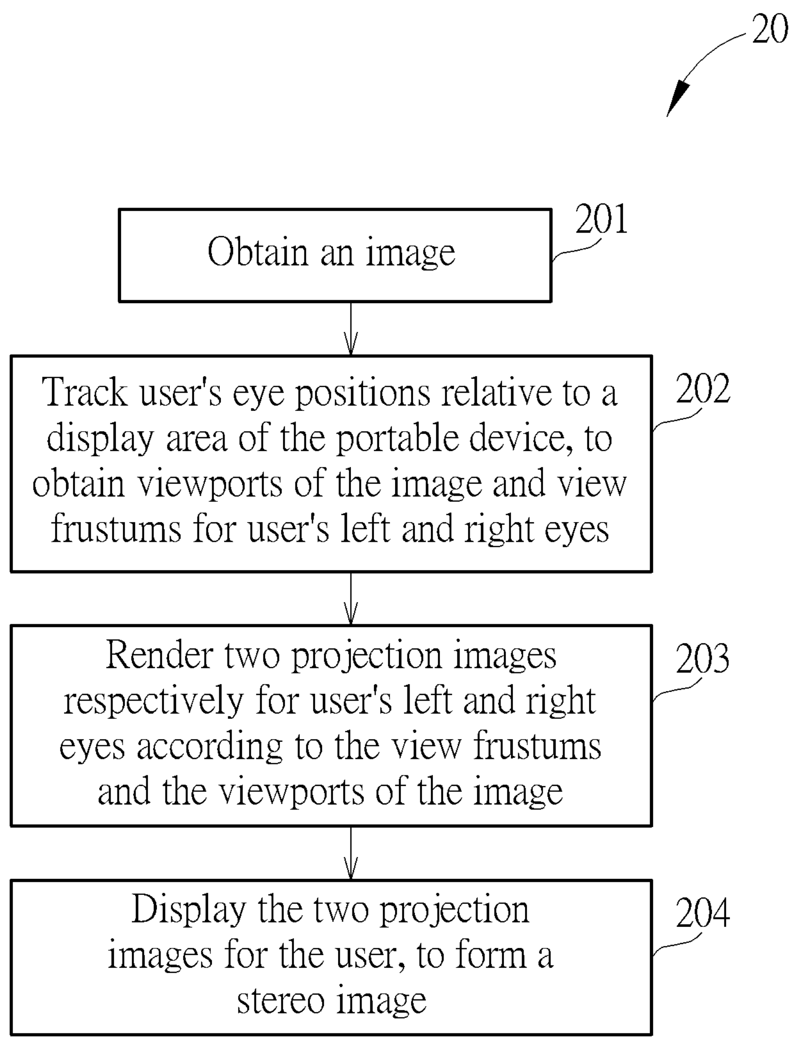
FIG. 2 is a flowchart of stereo image display according to an embodiment of the present disclosure.

Reference is made to FIG. 2, which is a flowchart of stereo image displaying process 20. The stereo image displaying process 20 could be utilized in the portable device 10, compiled into a program code 114, and include the following steps:

Step 201: Obtain an image.

Step 202: Track user's eye positions relative to a display area of the portable device, to obtain viewports of the image and view frustums for user's left and right eyes.

Step 203: Render two projection images respectively for user's left and right eyes according to the view frustums and the viewports of the image.

Step 204: Display the two projection images for the user, to form a stereo image.

According to stereo image displaying process 20, the portable device 10 is able to create realistic feeling for 3D graphic. By continuously tracking user's eye positions to update the viewport of the image and the view frustums, the projection image stays in the exact same spot and shape while user is moving his/her head or rotate the portable device 10. Thus, the displayed images are like the hologram image. That is, by adopting the stereo image displaying process 20, the portable device 10 can create a smooth motion parallax displaying.

Figure 3:
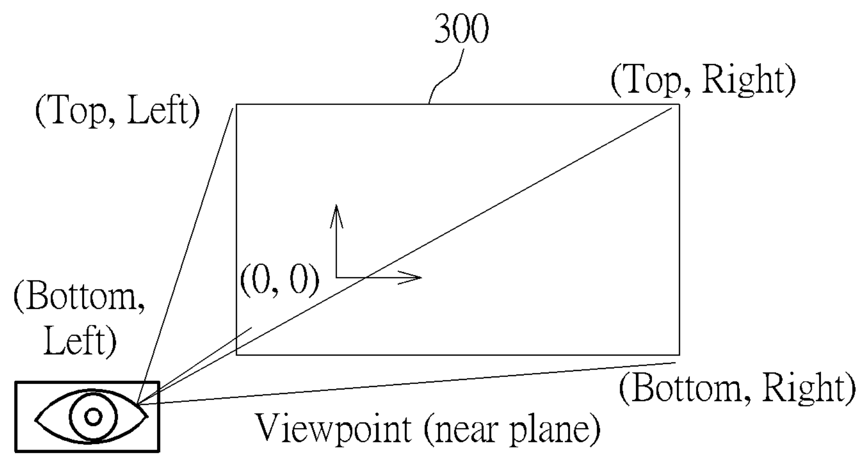
FIG. 3 is a schematic diagram of an eye tracking operation according to an embodiment.

Reference is made to FIG. 3 for illustrating eye tracking for viewport and view frustum obtaining. In FIG. 3, the portable device 10 tracks each eye (i.e. right eye and left eye) looking at the orthogonal point of the display area (e.g. a screen, or a display panel) of portable device 10, to form the view frustum. Note that, the near plane 300 of the view frustum is represented as the display area. In addition, the portable device 10 tracks a distance and an orientation between each eye of the user and the display area, to calculate viewports of the image.

Therefore, the portable device 10 obtains two viewports of the image and view frustums including the near plane and far plane for rendering two projection images according to the two viewports of the image and the two view frustums, so that the user sees the displayed image as a 3D image. Thus, when the portable device 10 becomes closer to or away from the user's eyes, the viewports of the image and the view frustums are both adjusted in accordance with the new position of the user's eye, so as to render smooth projection images for the user in motion.

Figure 4:
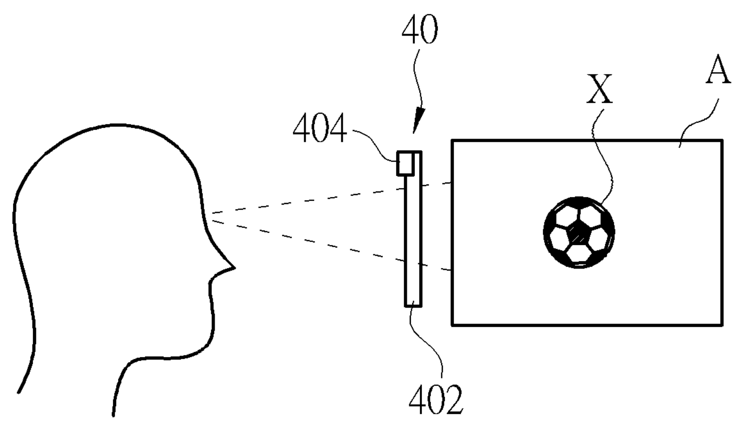
FIG. 4 is a schematic diagram of a hologram-like image according to an embodiment.
Figure 5:
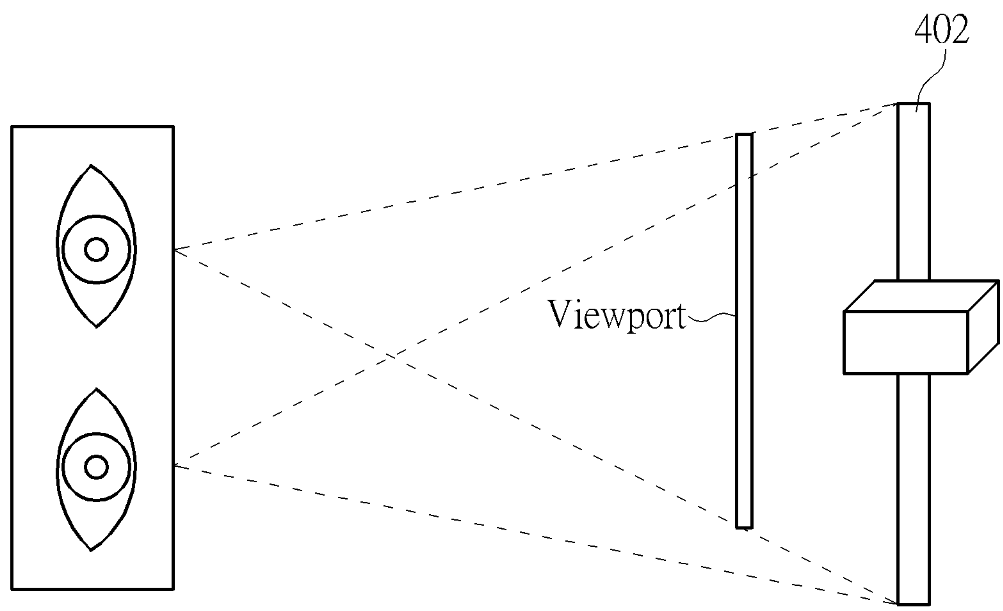
FIG. 5 is a schematic diagram of image rendering according to an embodiment of the present disclosure.

There are several applications of the 3D image display of the present invention. Reference is made to FIG. 4, which is a schematic diagram of a hologram-like image display by the portable device 40 according to an embodiment. The portable device 40 of FIG. 4 includes the display screen 402 for displaying the image A including the object X, and the camera 404 for tracking the user's eye positions, to obtain viewports of the image A and view frustums. In detail, please refer to FIG. 5 for illustrating image rendering. As mentioned in the above, to enhance viewing experience (namely smooth motion parallax for 3D image display), the present invention proposes that the object X floating above the display screen 402. In order to avoid the object X of the image A being clipped by the near plane, the viewport of the image A is set close to eye instead of display screen 402. For example, the viewport of the image A is set to ½ distance between eye and display screen 402. In an embodiment, the camera 404 may be a depth camera.

Figure 6:
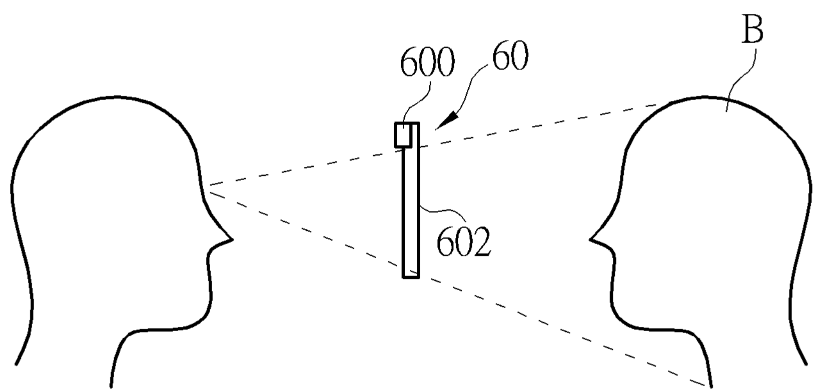
FIG. 6 is a schematic diagram of a mirror-like image according to an embodiment.
Figure 7:
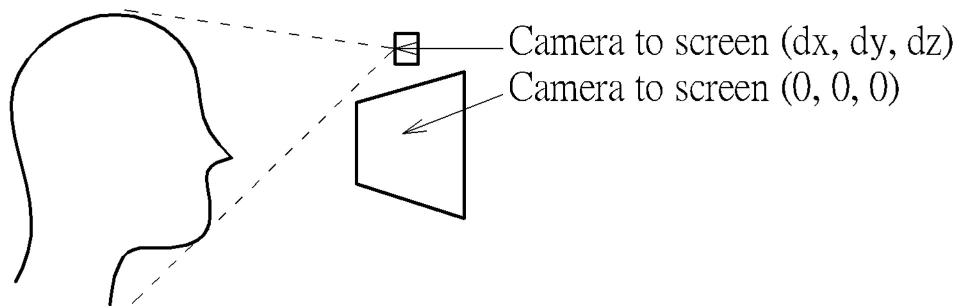
FIGS. 7-8 are a schematic diagram of image transformation according to an embodiment of the present disclosure.
Figure 8:
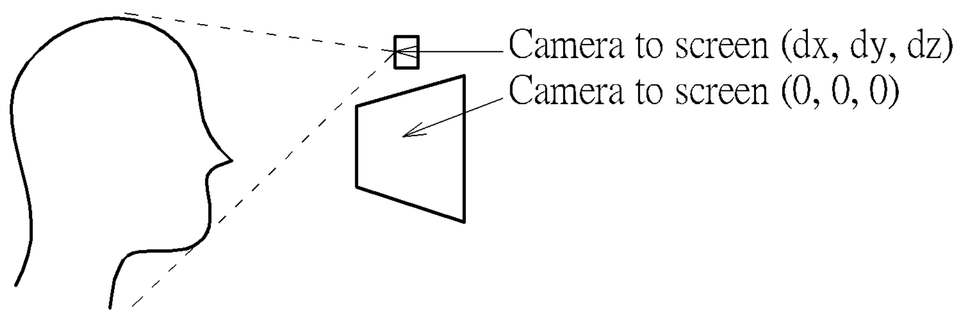

Reference is made to FIG. 6, which is a schematic diagram of a mirror-like image display by the portable device 60 according to an embodiment. The portable device 60 of FIG. 6 includes the camera 600 (e.g. a front-facing camera) and the display screen 602 for displaying the image B, which is user's face image, captured by the camera 600. In an embodiment, the camera 600 could be used for tracking the user's eye positions. Note that, due to the image B is captured by the camera 600, whose perspective space is different from the perspective space of the display screen 602, the image B captured by the camera shall be performed with a space transformation operation to transform the coordinate of camera 600 to the coordinate of the display screen 602. In detail, please refer to FIGS. 7-8. To let the user feels the mirror-like image, the image B is translated by vector {x,y,z} via matrix {1, 0, 0, dx, 0, 1, 0, dy, 0, 0, 1, dz, 0, 0, 0, 1}, whose coordinate is to be transformed to the center of the display screen 602. In addition, the translated image is then applied a rotation matrix {1, 0, 0, 0, 0, 1, 0, 0, 0, 0, −1, 0, 0, 0, 0, 1} for OpenGL coordinate system, so as to reverse the translated image for generating a mirror-like image. On the other hand, the camera 600 tracks the user's both eyes to obtain the view frustums and viewport of the mirror-like image for displaying to the user.

Figure 9:
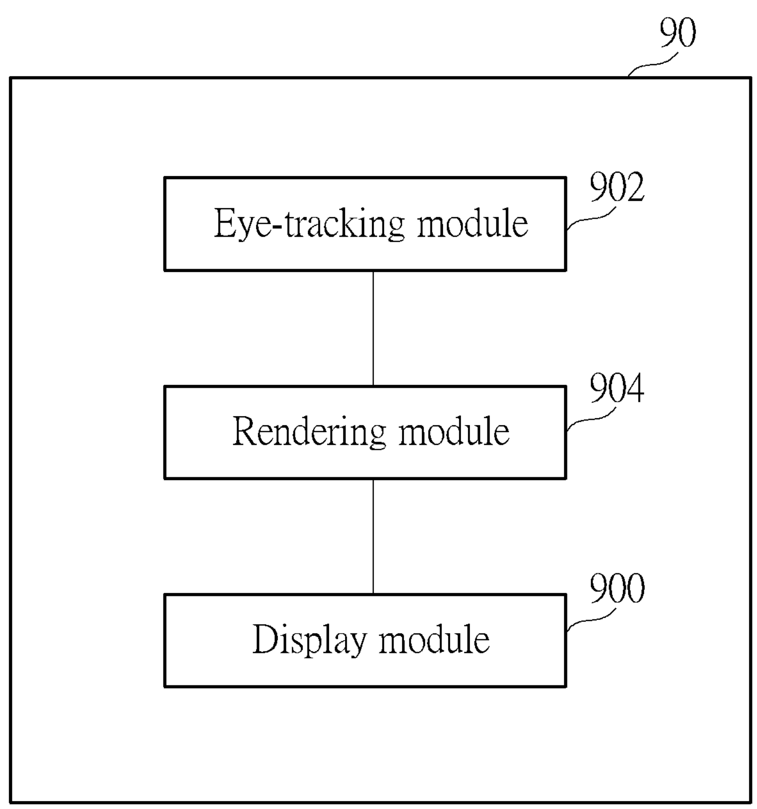
FIG. 9 is a schematic diagram of a portable device according to an embodiment.

Please refer to FIG. 9, which is a schematic diagram of the portable device 90 according to an embodiment. The portable device 90 includes the display module 900, the eye-tracking module 902 and the image rendering module 904. The display module 900 and the eye-tracking module 902 may be disposed at a front side of the portable device 90. The eye-tracking module 902 may include an infrared sensor, or other suitable sensors, and is used for detecting the user's position relative to the display area of the display module 900. The image rendering module 904 is connected to the display module 900 and the eye-tracking module 902, and used for adjusting viewport of the image and view frustums according to the user's eyes position detected by the eye-tracking module 902. Therefore, the image rendering module 904 renders the projection images for both eyes according to the view frustums and the viewport of the image. Finally, the display module 900 displays the projection images for the user, to create a 3D image feeling. The detailed operation of the portable device 90 could be referred from above, so it is omitted herein.

The mentioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the portable device 10.

In conclusion, the present invention addresses to provide a stereo image display method for a portable device. In detail, user's eye positions are used for obtain viewports of the image and view frustums, and thereby rendering images for user's left eye and right eye, to create the stereo image during motion activity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of stereo image display for a portable device, the method comprising:

obtaining an image;

tracking user's eye positions relative to a display area of the portable device, to obtain viewports of the image and view frustums for user's left and right eyes;

rendering two projection images respectively for user's left and right eyes according to the view frustums and viewports of the image;

displaying the two projection images for the user;

performing a space transformation operation on the image, for converting a coordinate of the image to a coordinate of the display area of the portable device, to generate a first image; and performing a mirror operation on the first image, for reversing the first image, to generate a second image;

wherein rendering two projection images respectively for user's left and right eyes according to the view frustums and viewports of the image comprises:

rendering mirror-like images for both eyes according to the viewports of the second image and the view frustums;

wherein rendering two projection images respectively for user's left and right eyes according to the view frustums and viewports of the image comprises:

rendering hologram-like images for both eyes according to the viewports of the image and the view frustums, wherein the viewports is set to a predetermined distance between the eyes and the display area.

* * * * *